(12) United States Patent
Torii

(10) Patent No.: US 7,650,453 B2
(45) Date of Patent: Jan. 19, 2010

(54) INFORMATION PROCESSING APPARATUS HAVING MULTIPLE PROCESSING UNITS SHARING MULTIPLE RESOURCES

(75) Inventor: Sunao Torii, Tokyo (JP)

(73) Assignee: NEC Corporation, Tokyo (JP)

( * ) Notice: Subject to any disclaimer, the term of this patent is extended or adjusted under 35 U.S.C. 154(b) by 293 days.

(21) Appl. No.: 11/663,036

(22) PCT Filed: Sep. 2, 2005

(86) PCT No.: PCT/JP2005/016087

§ 371 (c)(1),
(2), (4) Date: Mar. 15, 2007

(87) PCT Pub. No.: WO2006/030650

PCT Pub. Date: Mar. 23, 2006

(65) Prior Publication Data

US 2007/0266196 A1      Nov. 15, 2007

(30) Foreign Application Priority Data

Sep. 16, 2004  (JP) .............................. 2004-269884
Aug. 3, 2005   (JP) .............................. 2005-225389

(51) Int. Cl.
*G06F 13/00* (2006.01)
(52) U.S. Cl. ................ 710/240; 711/149; 711/151; 711/152
(58) Field of Classification Search ................. 710/240, 710/244; 711/147, 149, 151, 152
See application file for complete search history.

(56) References Cited

U.S. PATENT DOCUMENTS

| 5,740,461 A | 4/1998 | Jaggar et al. |
| 5,752,272 A | 5/1998 | Tanabe et al. |
| 6,651,148 B2 * | 11/2003 | Widdup .................. 711/158 |
| 7,287,110 B2 * | 10/2007 | Herz et al. .................. 710/107 |
| 2002/0161978 A1 * | 10/2002 | Apostol et al. ............... 711/151 |
| 2003/0140201 A1 | 7/2003 | Takizawa et al. |
| 2004/0107265 A1 | 6/2004 | Yasunaga et al. |

FOREIGN PATENT DOCUMENTS

| JP | 04-205534 | 7/1992 |
| JP | 05-210620 | 8/1993 |
| JP | 06-266616 | 9/1994 |
| JP | 08-044636 | 2/1996 |

(Continued)

OTHER PUBLICATIONS

"What is buffer?—a definition from Whatis.com"; last updated Oct. 5, 1999; accessed Feb. 25, 2009.*

*Primary Examiner*—Glenn A Auve
(74) *Attorney, Agent, or Firm*—Scully, Scott, Murphy & Presser, P.C.

(57) ABSTRACT

A technique for improving usage efficiency of a shared resource and improving processing capacity in an information processing apparatus, without increasing the transmission rate or the bit width of a bus is disclosed. Multiple bus interfaces are connected to at least one shared resource. The multiple bus interfaces are connected to a multi-layer bus respectively. Furthermore, data buffers for holding read data and write data respectively are provided for each bus interface. An arbiter arbitrates access requests from the respective bus interfaces, and the shared resource reads and writes data in response to the access request which has been given an access right.

11 Claims, 13 Drawing Sheets

FOREIGN PATENT DOCUMENTS

| | | |
|---|---|---|
| JP | 08-161254 | 6/1996 |
| JP | 10-091573 | 4/1998 |
| JP | 11-073366 | 3/1999 |
| JP | 11-120074 | 4/1999 |
| JP | 2000-003302 | 1/2000 |
| JP | 2000-047930 | 2/2000 |
| JP | 2000-132503 | 5/2000 |
| JP | 2001-005718 | 1/2001 |
| JP | 2001-067305 | 3/2001 |
| JP | 2001-135083 | 5/2001 |
| JP | 2001-209609 | 8/2001 |
| JP | 2001-282612 | 10/2001 |
| JP | 2001-356961 | 12/2001 |
| JP | 2002-288120 | 10/2002 |
| JP | 2002-312309 | 10/2002 |
| JP | 2004-094819 | 3/2004 |
| JP | 2004-171209 | 6/2004 |
| JP | 2004-199608 | 7/2004 |

* cited by examiner

INFORMATION PROCESSING APPARATUS HAVING MULTIPLE PROCESSING UNITS SHARING MULTIPLE RESOURCES

TECHNICAL FIELD

The present invention relates to an information processing apparatus consisting of an application processor mounted with multiple general purpose or application specific processors, or a dedicated LSI, an ASIC (Application Specific Integrated Circuit), a SOC (System On Chip) and the like.

BACKGROUND ART

FIG. 1 shows an example of a conventional information processing apparatus mounted with multiple general purpose or application specific processors. FIG. 1 shows an example of an application processor to be mounted on a mobile phone or on a personal digital assistant.

As shown in FIG. 1, information processing apparatus 301 has multiple information processing units and multiple shared resources commonly used by the respective information processing units, all of which are configured to be connected so that they can mutually send and receive information via internal bus 312.

In the case of the application processor shown in FIG. 1, the information processing unit is a general purpose processor such as CPU 302 or DSP 303, or a peripheral controller such as DMA controller (DMAC) 304, camera controller 305 or LCD controller 306.

Moreover, the shared resource is SDRAM controller 307 for controlling reading/writing of data with respect to SRAM 308 which is an internal memory and a SDRAM (Synchronous Dynamic Random Access Memory) which is an external memory, external bus bridge 309 which is an interface with an external bus to which the external memory (for example, flash memory) is connected, various peripheral devices 310 and 311, and the like.

In the information processing apparatus provided with such multiple information processing units, a common method is to use a standard bus as internal bus 312 and accordingly to design a bus interface of each information processing unit, in order to facilitate apparatus design or performance verification. As the standard bus, for example, AHB (Advanced High-performance Bus) for realizing AMBA (Advanced Microcontroller Bus Architecture) proposed by ARM Ltd. (Cambridge, England) has been known. It should be noted that the AHB has been described in detail, for example, in U.S. Pat. No. 5,740,461.

DISCLOSURE OF THE INVENTION

However, in the conventional information processing apparatus shown in FIG. 1, if a process having a heavy load, such as a process of playing moving images, is performed, most of traffic in internal bus 312 is image data and therefore sufficient bus band cannot be secured for processes by CPU 301 and the like, which causes a problem of reduced processing performance.

In order to solve such a problem, a configuration is conceivable in which multiple independent buses are provided, that is, for example, a bus dedicated to the image data is provided and the like. However, in such a configuration, multiple shared resources such as memories have to be connected to the respective buses, which causes the problem of increased cost of the information processing apparatus. Furthermore, also the problem of many constraints to be placed on software development occurs, in which accesses are restricted or delayed when the data is written or read with respect to the memories across the multiple buses, and the like.

It should be noted that another method of securing the bus band is conceivable in which the bit width of a data bus is enlarged. For example, if the data bus having a 32-bit width is enlarged to 64-bit width, data transfer time is expected to be reduced by half. However, since the general purpose processor also executes processes of reading or writing data having a bit width of 32-bit or less, a good effect cannot be obtained even by enlarging the bit width of the bus.

Therefore, a bus structure referred to as Multi-Layer AHB provided with multiple buses in parallel has been proposed by the above described ARM Ltd. FIG. 2 shows a configuration of the Multi-Layer AHB.

As shown in FIG. 2, the Multi-Layer AHB has a configuration in which multiple information processing units 401 to 403 (three units shown in FIG. 2) and multiple shared resources (four resources shown in FIG. 2) 408 to 411 are connected via multi-layer bus 407. Information processing units 401 to 403 are connected to multi-layer bus 407 via bus interfaces 404 to 406 provided in the respective information processing units, and shared resources 408 to 411 are connected to multi-layer bus 407 via bus interfaces 412 to 415 provided in the respective shared resources.

Multi-layer bus 407 is configured to have input stages 427 to 429 which are input/output interfaces provided that correspond to information processing units 401 to 403, multiplexers 420 to 423 provided that correspond to shared resources 408 to 411, for arbitrating various requests (access requests) issued by respective information processing units 401 to 403 with respect to shared resources 408 to 411, and decoders 424 to 426 for controlling transfer of access requests issued by information processing units 401 to 403 to their sending destinations, that is, shared resources 408 to 411.

In such a configuration, the access requests issued by information processing units 401 to 403 are sent to input stages (Input Stage) 416 to 418 of multi-layer bus 407 via bus interfaces (BUS I/F) 404 to 406 provided in the respective information processing units.

Decoders (Decode) 419 to 421 decode the access requests received at input stages (Input Stage) 416 to 418 and transfer the access requests to multiplexers (MUX) 420 to 423 that correspond to the shared resources of their destinations to where they will be sent. Multiplexers 420 to 423 arbitrate the access requests issued by information processing units 401 to 403, and send the access requests in the order of being permitted, to shared resources (Slave) 408 to 411 via bus interfaces (BUS I/F) 412 to 415.

In such a configuration, even if multiple information processing units 401 to 403 simultaneously access shared resources 408 to 411, the data can be simultaneously sent and received without causing any conflict, which can realize substantial enlargement of the bus band.

Incidentally, in recent years, it is more complicated for SDRAM typically used as a mass storage memory to control data writing or reading than a SRAM (Static Random Access Memory) and the like, and in SDRAM, delay occurs between accepting the access request and when the data is actually written or the data can be obtained. However, in SDRAM, data can be read or written in units of multiple words, and high speed data reading/writing can be realized by sequentially giving commands. Furthermore, in a DDR (Double Data Rate)-SDRAM, data is written/read at timings of a rising edge and a falling edge of the operation clock respectively, which enables the reading process or the writing process to operate at a speed two times faster than a normal SDRAM.

If this DDR-SDRAM is used as the external memory of the information processing apparatus, when the transmission rate or the bit width of the bus or the bridge connected to the DDR-SDRAM is set to the same rate or bit width as that of the DDR-SDRAM, the processing speed of the DDR-SDRAM becomes faster than the transmission rate of the bus. Therefore, it is necessary to set the transmission rate of the bus to two times faster or to set the bit width to two times larger to match the transmission capability of the bus to the data processing speed of the DDR-SDRAM.

However, when the transmission rate of the bus is set to two times faster, problems of delay due to cabling or increased electric power consumption occur. Also, when the bit width of the bus is set to two times larger, the bit width becomes unmatched to the bit width of the information processing unit, which requires a device for converting the bit width and the like.

As a method of mitigating the effect of delay in response in the DDR-SDRAM, a protocol referred to as Split Transaction is provided in the high-performance bus such as the above described AHB. In the Split Transaction, for example, when a data reading request issued by the information processing unit with respect to the memory is accepted at a memory controller (bus interface), the above described memory controller releases the bus once to execute the reading process, and at a time point when the requested data reading process has been entirely completed, reestablishes the bus connection with respect to the requesting information processing unit and returns the read data. Usage of such a protocol enables accepting memory access requests from other information processing units while releasing the bus. In other words, the commands can be sequentially accepted.

However, although such a method can hide the delay in response in the DDR-SDRAM itself, the method cannot solve the above described imbalance between the processing speed of the DDR-SDRAM and the transmission capability of the bus. Moreover, even if the Split Transaction is employed, since data transfer cannot be executed while accepting the request from an arbitrary information processing unit, it is hard to say that the DDR-SDRAM is utilized with sufficiently high efficiency.

Furthermore, with respect to hardware supporting the Split Transaction, logical complexity of the bus interface of the information processing unit, an arbiter of the bus, the bus interface of the shared resource and the like is increased. Therefore, ARM Ltd. has proposed AXI (Advanced eXtensible Interface) which logically separates the request from the data transfer, although it is hard to say that the logical complexity has been sufficiently improved. In addition, in order to connect modules created based on a conventional bus standard and the like, it is necessary to use a module to convert the bus convention or to redesign the bus interface.

The present invention has been made in order to solve the above described problems of prior art, and it is an object of the present invention to provide an information processing apparatus which can improve the usage efficiency of the shared resource and improve processing capacity, without increasing the transmission rate or the bit width of the bus.

In order to achieve the above described object, the information processing apparatus of the present invention connects multiple bus interfaces to at least one shared resource, and connects these bus interfaces to a multi-layer bus respectively. Furthermore, the information processing apparatus includes data buffers for holding read data and write data respectively for each bus interface. An arbiter arbitrates access requests from the respective bus interfaces, and data reading and writing and the like are performed in response to the access request which has obtained an access right to the shared resource.

In such a configuration, since multiple bus interfaces are provided that correspond to the shared resource, multiple access requests can be sequentially scheduled in the shared resource without using the Split Transaction, which can reduce the effect of the delay in response in the SDRAM and the like. Also, accesses with respect to shared resources having different processing speeds become possible without increasing the transmission rate or the bit width of the bus.

In addition, since a subsequent access request can be accepted even while the process of reading data from the shared resource to the read buffer or a process of writing data from the write buffer to the shared resource is being executed, it is possible to sequentially give the access requests to the shared resource, which improves the usage efficiency of the shared resource.

BEST MODE FOR CARRYING OUT THE INVENTION

Embodiments of the present invention will be described in detail with reference to the drawings.

FIRST EMBODIMENT

Figure 1:
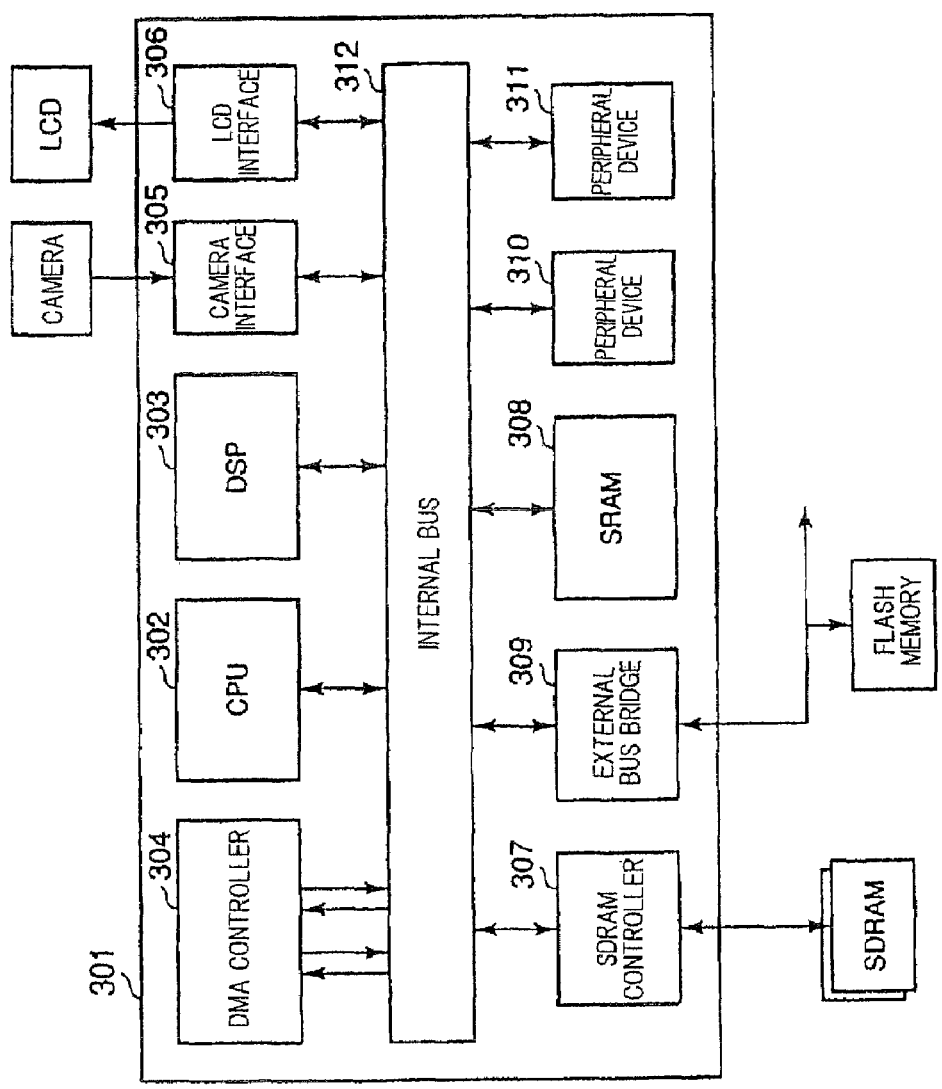
FIG. 1 is a block diagram showing a configuration of an application processor to be mounted on a mobile phone or on a personal digital assistant.
Figure 2:
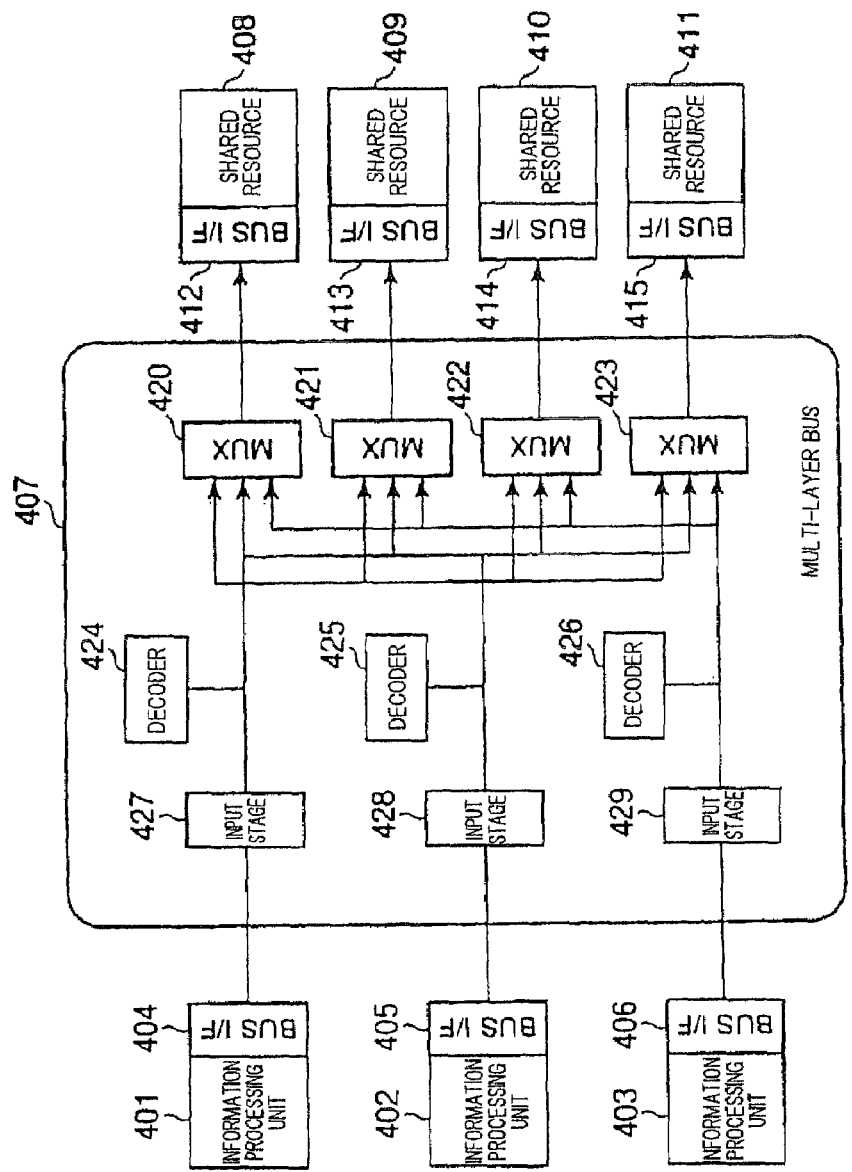
FIG. 2 is a block diagram showing a configuration of Multi-Layer AHB.
Figure 3:
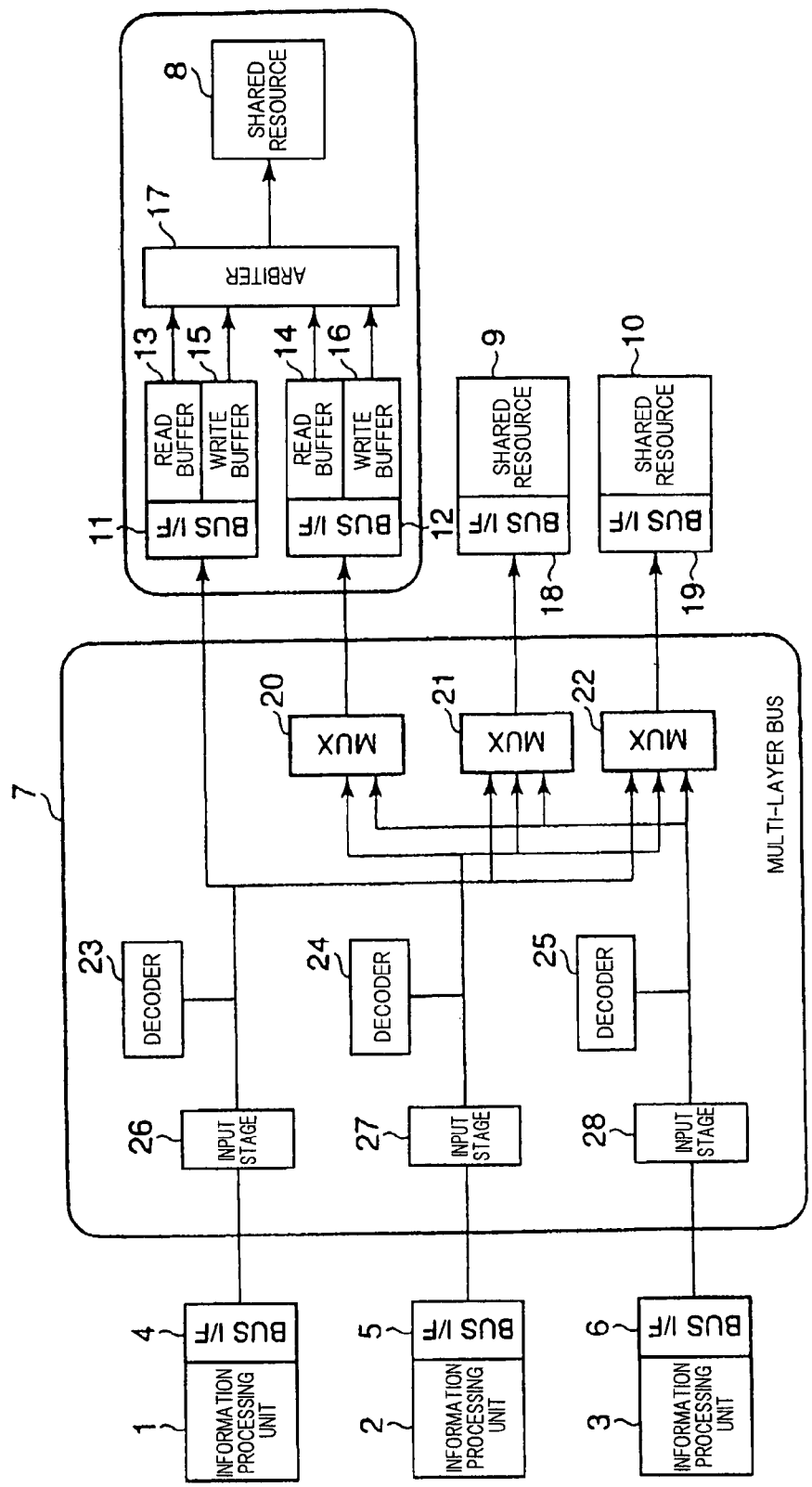
FIG. 3 is a block diagram showing a configuration of the first embodiment of an information processing apparatus of the present invention.

FIG. 3 is a block diagram showing a configuration of the first embodiment of an information processing apparatus of the present invention.

As shown in FIG. 3, the information processing apparatus of the first embodiment includes multiple information processing units 1 to 3 (three units shown in FIG. 3) and multiple shared resources (three resources shown in FIG. 3) 8 to 10, all of which are configured to be connected via multi-layer bus 7. Information processing units 1 to 3 are connected to multi-layer bus 7 via bus interfaces 4 to 6 provided in the respective information processing units. Shared resources 9 and 10 are connected to multi-layer bus 7 via bus interfaces 18 and 19.

This embodiment has a configuration in which one arbitrary shared resource (here, shared resource 8) among the multiple shared resources is provided with two bus interfaces (BUS I/F) 11 and 12 connected to multi-layer bus 7. Bus interfaces 11 and 12 are configured to have read buffers 13 and 14 for holding data read from shared resource 8 and write buffers 15 and 16 for holding data to be stored in shared resource 8. Bus interfaces 11 and 12 and shared resource 8 are connected via arbiter 17 for arbitrating access requests with respect to shared resource 8.

Multi-layer bus 7 is configured to have input stages 26 to 28 which are input/output interfaces provided that correspond to information processing units 1 to 3, multiplexers 20 to 22 for arbitrating various requests (access requests) issued by respective information processing units 1 to 3 with respect to shared resources 8 to 10, and decoders 23 to 25 for transferring the access requests issued by information processing units 1 to 3 to where they will be sent, that is, shared resources 8 to 10. It should be noted that although FIG. 3 shows a configuration example having three information processing units and three shared resources respectively, the number of the information processing units and the shared resources are not limited to three, and may be any numbers respectively.

In such a configuration, the access requests issued by information processing units 1 to 3 are sent to input stages (Input Stage) 26 to 28 of multi-layer bus 7 via bus interfaces 4 to 6 provided in the respective information processing units.

Decoders (Decode) 23 to 25 decode the access requests received at input stages (Input Stage) 26 to 28 and transfer the access requests to multiplexers (MUX) 20 to 22 corresponding to the shared resources of the destinations to where they will be sent. Multiplexers 20 to 22 arbitrate the access requests issued by information processing units 1 to 3, and send the access requests in an order of obtaining permission, to shared resources (Slave) 8 to 11 via bus interfaces (BUS I/F) 11, 12, 18 and 19.

In the information processing apparatus shown in FIG. 3, two bus interfaces 11 and 12 are provided that correspond to shared resource 8, the access request issued by information processing unit 1 with respect to shared resource 8 is sent directly to bus interface 11, and the access request issued by information processing unit 2 or information processing unit 3 with respect to shared resource 8 is sent to bus interface 12 via multiplexer 20. In addition, the access requests issued by information processing unit 2 and information processing unit 3 with respect to shared resource 8 are arbitrated by multiplexer 20.

Since shared resources 9 and 10 are configured to have one bus interface, similar to a conventional configuration, the access requests from information processing units 1 to 3 are arbitrated by multiplexers 21 and 22.

In this way, since multiple bus interfaces are provided that corresponding to one shared resource 8 and since arbiter 17 arbitrates the access requests with respect to shared resource 8, the access requests from the multiple information processing units can be sequentially scheduled without using Split Transaction.

Typically, in SDRAM, when different pages in the same bank are sequentially accessed, ROW cannot be opened for subsequent access until a necessary time has elapsed after precharging once, due to the characteristics of SDRAM. Also, switching between read and write requires a certain interval. In this embodiment, arbiter 17 knows the state of SDRAM in each bank from the access request performed in the past and from the time elapsed since execution of the access request, and arbitrates to select the access request that requires a short time to be accessed, taking into account the characteristics and the state of the SDRAM, with respect to the access requests from multiple read buffers 13 and 14 or write buffers 15 and 16. When there is an access request, arbiter 17 may determine the priority of the access request and perform arbitration according to its priority. Thereby, the entire system can effectively enlarge the data band of the SDRAM.

Figure 10:
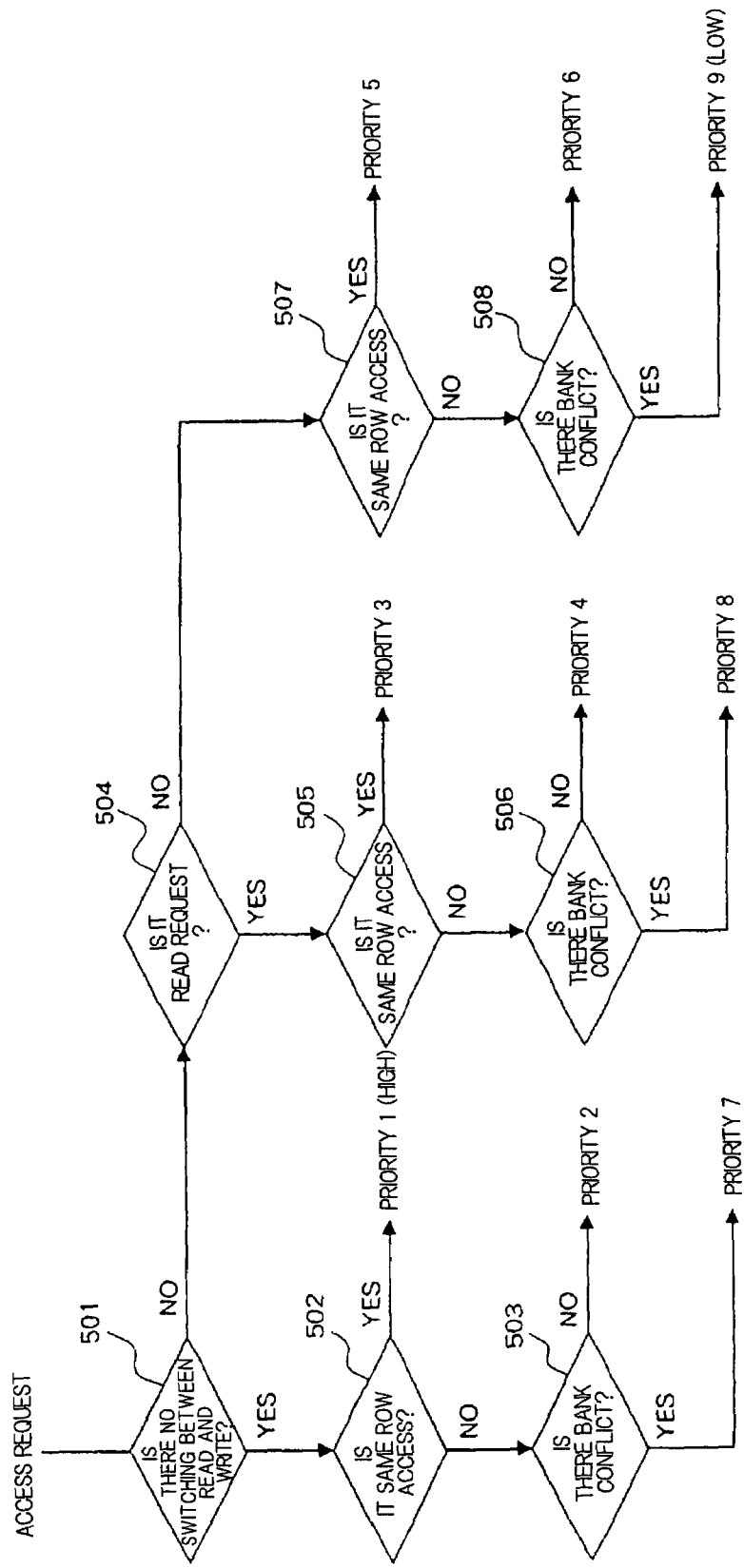
FIG. 10 is a flowchart showing an example of a priority determination algorithm for SDRAM arbitration.

FIG. 10 is a flowchart showing an example of a priority determination algorithm for SDRAM arbitration. In this case, there are priorities of nine phases, that is, priorities 1 to 9, in which priority 1 has the highest priority and priority 9 has the lowest priority.

With reference to FIG. 10, when there is an access request, arbiter 17 first determines whether or not there is the switching between read and write in execution of the access request (step 501). If switching has occurred between read and write, arbiter 17 determines whether the access request is a read request (step 504).

If it is determined that there is no switching between read and write at step 501, arbiter 17 determines whether or not the access request is the access with respect to the same ROW (step 502). If it is the access with respect to the same ROW, the access request is determined to have priority 1. At step 502, if it is not the access with respect to the same ROW, arbiter 17 determines whether or not there is a bank conflict (step 503). If there is no bank conflict, the access request is determined to have priority 2, and if there is a bank conflict, the access request is determined to have priority 7.

Moreover, if it is determined that the access request is the read request at step 504, arbiter 17 determines whether or not it is the access with respect to the same ROW (step 505). If it is the access with respect to the same ROW, the access request is determined to have priority 3. At step 505, if it is not the access with respect to the same ROW, arbiter 17 determines whether or not there is the bank conflict (step 506). If there is no bank conflict, the access request is determined to have priority 4, and if there is a bank conflict, the access request is determined to have priority 8.

Moreover, if it is determined that the access request is not the read request at step 504, arbiter 17 determines whether or not it is the access with respect to the same ROW (step 507). If it is the access with respect to the same ROW, the access request is determined to have priority 5. At step 507, if it is not the access with respect to the same ROW, arbiter 17 determines whether or not there is a bank conflict (step 508). If there is no bank conflict, the access request is determined to have priority 6, and if there is a bank conflict, the access request is determined to have priority 9.

In this way, arbiter 17 determines the priority of the access request with respect to shared resource 9, and arbitrates to preferentially select the access request having the higher priority. Then if multiple access requests are determined to have the same priority, any of the access requests may be first selected by an arbitrary method. For example, any one access request may be randomly selected from among the access requests having the same priority, or may be fairly selected according to a policy referred to as "round robin".

In addition, in the access with respect to typical SDRAM, opening and precharging of ROW can be completed at one time for the access with respect to the same bank and the same ROW. Therefore, arbiter 17 of this embodiment may arbitrate to sequentially select the accesses with respect to the same bank and the same ROW.

For example, it is assumed that a data write access request for BANK=1, ROW=10 and COLUMN=20 of the SDRAM has been issued by information processing unit 1, and also that data write access request for BANK=1, ROW=10 and COLUMN=12 has been issued by information processing unit 2. These written data are stored in write buffers 15 and 16 respectively. In that case, by sequentially issuing those requests to SDRAM of shared resource 8 by arbiter 17, the system can operate to sequentially process the two access requests while opening a page of BANK=1 and ROW=10 to write in regard to information processing units 1 and 2 and can then close the page by precharging. Thereby performance is improved and the number of pages that are opened and closed is minimized, which enables saving electric power consumption.

However, in such arbitration with a high regard only for the data band, it is envisioned that actual access cannot be easily performed due to continuous loss of arbitration, and data transfer efficiency may be reduced for some access requests. With respect to this, arbiter 17 may be provided with a counter for counting the number of times that arbitration is performed for each access request, and may preferentially select the access request for which the number of times of arbitration has become more than or equal to a predetermined number of times, regardless of the state of the SDRAM.

In addition, there may be a difference among data delay tolerances in respective information processing units 1 to 3. In that case, a method of arbitrating that places a high regard only on data transfer efficiency, based on the state of SDRAM, does not provide sufficient arbitration for the system. With respect to it, arbiter 17 may previously define a priority as an access originator, to each of information processing units 1 to 3, and when there is an access request to shared resource 8, arbiter 17 may identify which information processing unit has issued the access request and may arbitrate the access request by taking into in consideration both the priority, as the access originator, and the data transfer efficiency.

On the other hand, depending on processes of the information processing units 1 and 2, it is necessary to inseparably perform multiple memory accesses with respect to a memory of shared resource 8 under exclusive control. During a series of those memory accesses, hardware ensures that other information processing units do not access that memory area. For example, this has been defined by an instruction referred to as SWAP in the instruction set of an ARM926 processor supplied by ARM Ltd. With this SWAP instruction, since the read request and the write request are sequentially and inseparably performed with respect to the same address, other accesses are not permitted between this read request and this write request to lock an AHB bus, which accordingly locks the memory.

In the information processing apparatus shown in FIG. 3, shared resource 8 is connected to multi-layer bus 7 via multiple bus interfaces 11 and 12. Therefore, shared resource 8 is not completely locked just by locking the bus with one bus interface. For example, if information processing unit 2 performs the locking with respect to shared resource 8, the bus connected to bus interface 12 is locked and the access from information processing unit 3 cannot be performed. However, since information processing unit 1 is connected via another bus interface 11, information processing unit 1 can access shared resource 8. As a result, the inseparable access with respect to shared resource 8 by information processing unit 2 cannot be ensured.

With respect to this, as an example, when there is an access request based on locking with respect to shared resource 8 on bus interface 12, in order to ensure that multiple accesses are inseparably performed, all contents related to shared resource 8 are cleared in read buffers 13 and 14 and also contents of write buffers 15 and 16 are reflected in shared resource 8. Then after that process is completed, a process to temporarily make acceptance of access to shared resource 8 via bus interface 11 pending may be performed to inseparably process the multiple access requests from information processing units 2. This enables an exclusive access to shared resource 8. Meanwhile bus arbiter 17 does not permit other accesses to participate in the arbitration.

However, with this method, all accesses to addresses unrelated to an exclusive area in shared resource 8 are also kept waiting during the exclusive access to shared resource 8. This control significantly impacts the performance.

Therefore, as another example, addresses for exclusive access may be limited to a certain range. This can realize exclusive access while preventing usage efficiency of shared resource 8 from being reduced. FIG. 11 is a flowchart showing an arbiter operation for enabling exclusive access.

Figure 11A:
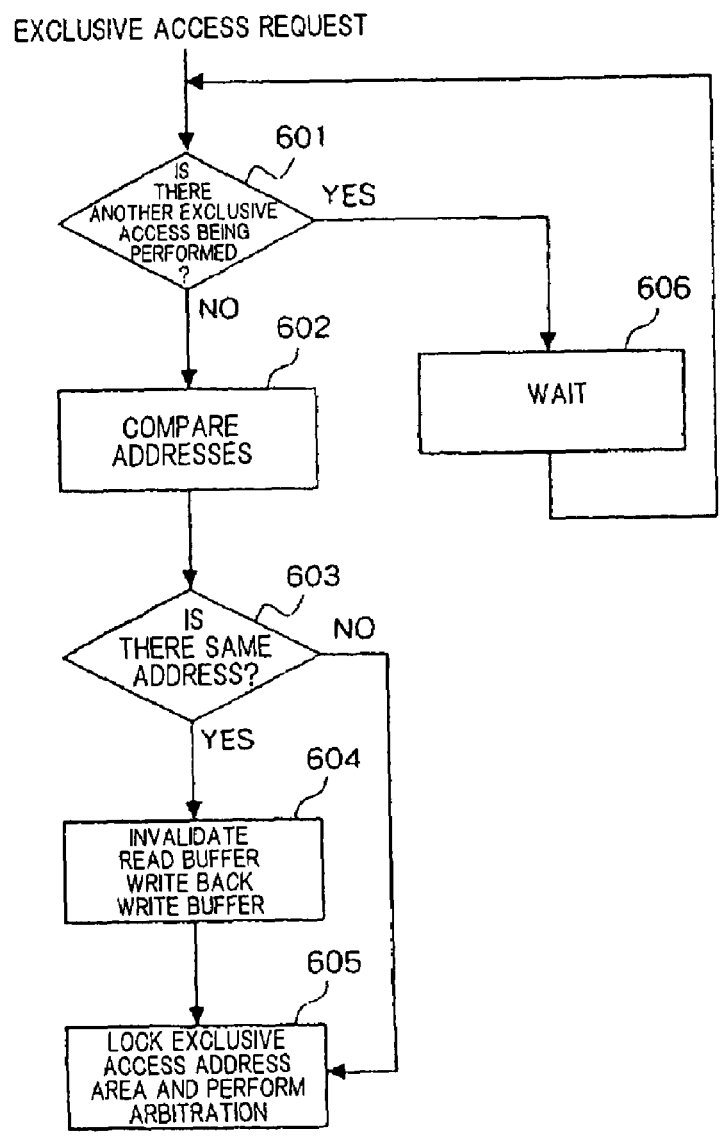
FIG. 11A is a flowchart showing an arbiter operation when there has been an exclusive access.

In FIG. 11A, when there is an exclusive access request, arbiter 17 first checks whether there is another information processing unit which is performing the exclusive access (step 601). If there is another information processing unit which is performing exclusive access, arbiter 17 waits until the exclusive access has been completed (step 606).

In a state where there is no other information processing unit which is performing exclusive access, arbiter 17 compares the address for the access request and the addresses stored in the read buffer and the write buffer (step 602), and determines whether the same address as the address for the access request exists in the read buffer or in the write buffer (step 603).

If the same address exists in the read buffer or in the write buffer, arbiter 17 invalidates the read buffer, or writes back the contents of the write buffer to shared resource 8 (step 604).

If the same address does not exist in the read buffer or in the write buffer in the determination at step 603, or after the process at step 604, arbiter 17 permits a series of exclusive accesses with respect to shared resource 8 as normal arbitration (step 605).

Figure 11B:
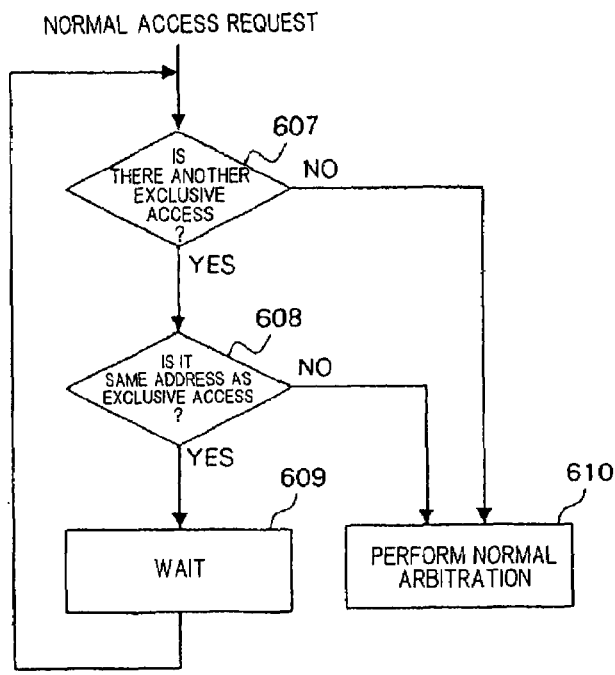
FIG. 11B is a flowchart showing the arbiter operation when there has been a nonexclusive access.

On the other hand, in FIG. 11B, when there is a nonexclusive access request, arbiter 17 checks whether there is another exclusive access (step 607). If there is no other exclusive access, arbiter 17 permits access with respect to shared resource 8 as normal arbitration (step 610).

If there is another exclusive access in the determination at step 607, arbiter 17 determines whether or not the access request is the access request to the same address as that exclusive access (step 608). If it is not the same address, arbiter 17 permits the access with respect to shared resource 8 independently of the exclusive access, as the normal arbitration (step 610).

If it is determined at step 608 that the access request to the same address as the other exclusive access request, arbiter 17 waits until the exclusive access has been completed (step 609) and returns to the process at step 607.

It should be noted that "the same address" refers to the same address range and corresponds to a data area in which data is stored in the read buffer or the write buffer.

Also in this embodiment, the buses capable of performing such exclusive access may be limited to one. Thereby, the process of determining whether there is another information processing unit which is performing exclusive access at step 601 becomes unnecessary, and also logical complexity due to a conflict in the case in which the multiple information processing units simultaneously perform the exclusive access is eliminated.

In addition, by providing two bus interfaces 11 and 12 corresponding to one shared resource 8, bus interfaces 4 to 6, provided in information processing units 1 to 3, or bus interfaces 18 and 19, provided in other shared resources 9 and 10, and the like can be connected without changing their specifications.

Furthermore, since a subsequent access request can be accepted even while the process of reading data from shared resource 8 to the read buffer or the process of writing data from the write buffer to the shared resource is being executed, it is possible to sequentially give the access requests to shared resource 8, which improves the usage efficiency of shared resource 8.

Next, operations of the information processing apparatus of this embodiment will be described with an example of the case where the processing speed of shared resource 8 is two times faster than the transmission rate of multi-layer bus 7 (for example, in the case where shared resource 8 is a DDR-SDRAM).

Figure 4:
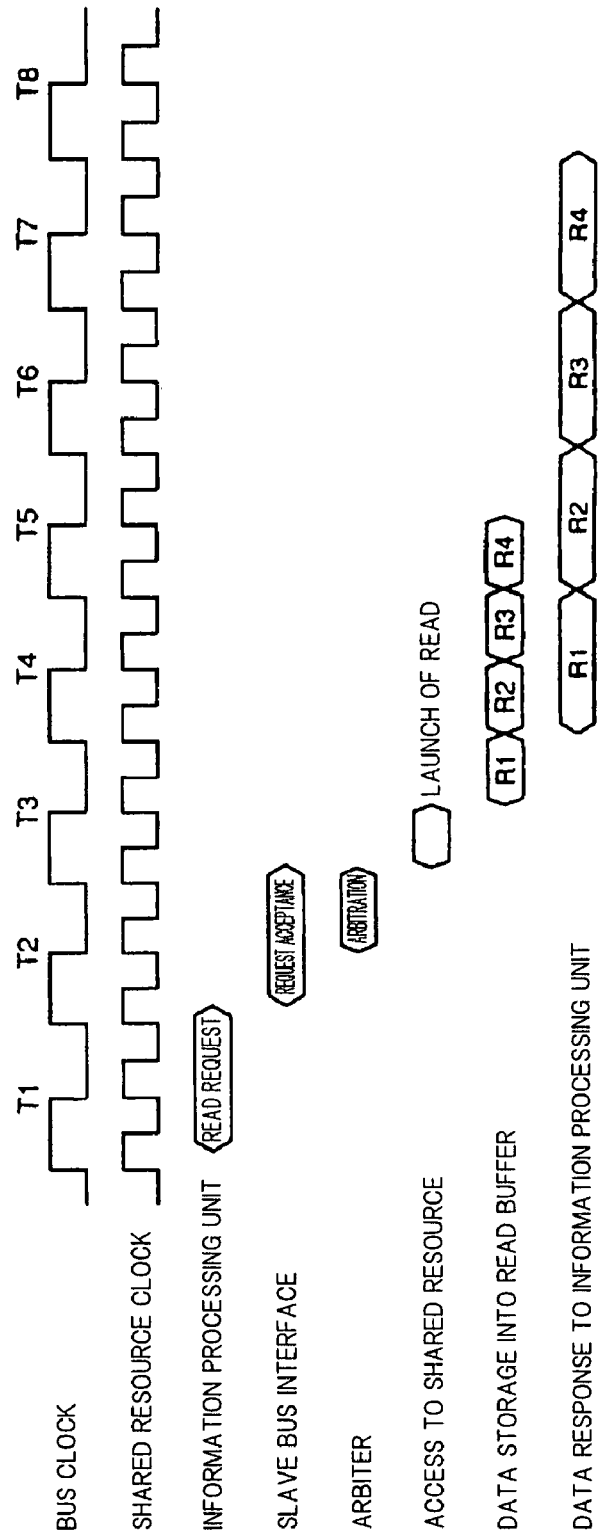
FIG. 4 is a timing chart showing an operation of the information processing apparatus shown in FIG. 3 when it reads data.

First, an operation in the case where information processing unit 1 reads the data from shared resource 8 will be described by using FIG. 4. FIG. 4 is a timing chart showing the operation of the information processing apparatus shown in FIG. 3 when it reads the data.

As shown in FIG. 4, when information processing unit 1 issues a data reading request (hereinafter referred to as "read request") to shared resource 8, the above described read request is sent via bus interface 4 to multi-layer bus 7 at a timing of T1. When input stage 26 of multi-layer bus 7 receives the read request from information processing unit 1, decoder 23 determines that it is the access request to shared resource 8, based on the address of the access destination included in the above described read request, and transfers the above described read request to bus interface 11.

Bus interface 11 accepts this access request at a timing of T2. When bus interface 11 determines that the access request is the read request, bus interface 11 transfers the above described read request to arbiter 17 via read buffer 13.

When the access request to shared resource 8 is permitted in bus arbitration by arbiter 17, read buffer 13 starts the process of reading the data from shared resource 8 at a timing of T3 (launch of Read). Here, it is assumed that shared resource 8 includes a transmission capability which is two times larger than that of multi-layer bus 7, and the data is read out in units of four words. In that case, data read out (hereinafter referred to as "read data") at a timing from the second half of T3 to T5 shown in FIG. 4 is stored in read buffer 13.

Also read buffer 13 starts returning the data to information processing unit 1 from a timing of T4. Since transferring the read data with respect to information processing unit 1 requires a longer time than transferring the data from shared resource 8 to read buffer 13, the data transfer is completed at a timing of T7 shown in FIG. 4.

Since shared resource 8 changes to a waiting state from the timing of the second half of T5 shown in FIG. 4, the access request via read buffer 14 or write buffers 15 and 16 can be processed from a timing of T6.

Figure 12:
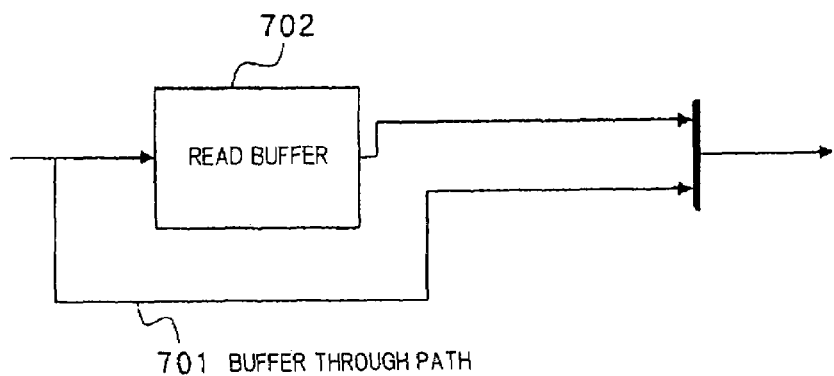
FIG. 12 shows a configuration in which the read buffer is provided with a buffer through path.

On the other hand, with respect to read buffers 13 and 14 shown in FIG. 3, a path connecting bus interface 11 and arbiter 17 without passing through the buffer (hereinafter referred to as "buffer through path") may be provided. FIG. 12 shows a configuration in which the read buffer is provided with the buffer through path. With reference to FIG. 12, buffer through path 701 that does not pass through read buffer 702 is provided to have a configuration in which the data can go without passing through read buffer 702. According to this configuration, data response cycle for the read access can be reduced.

Figure 13:
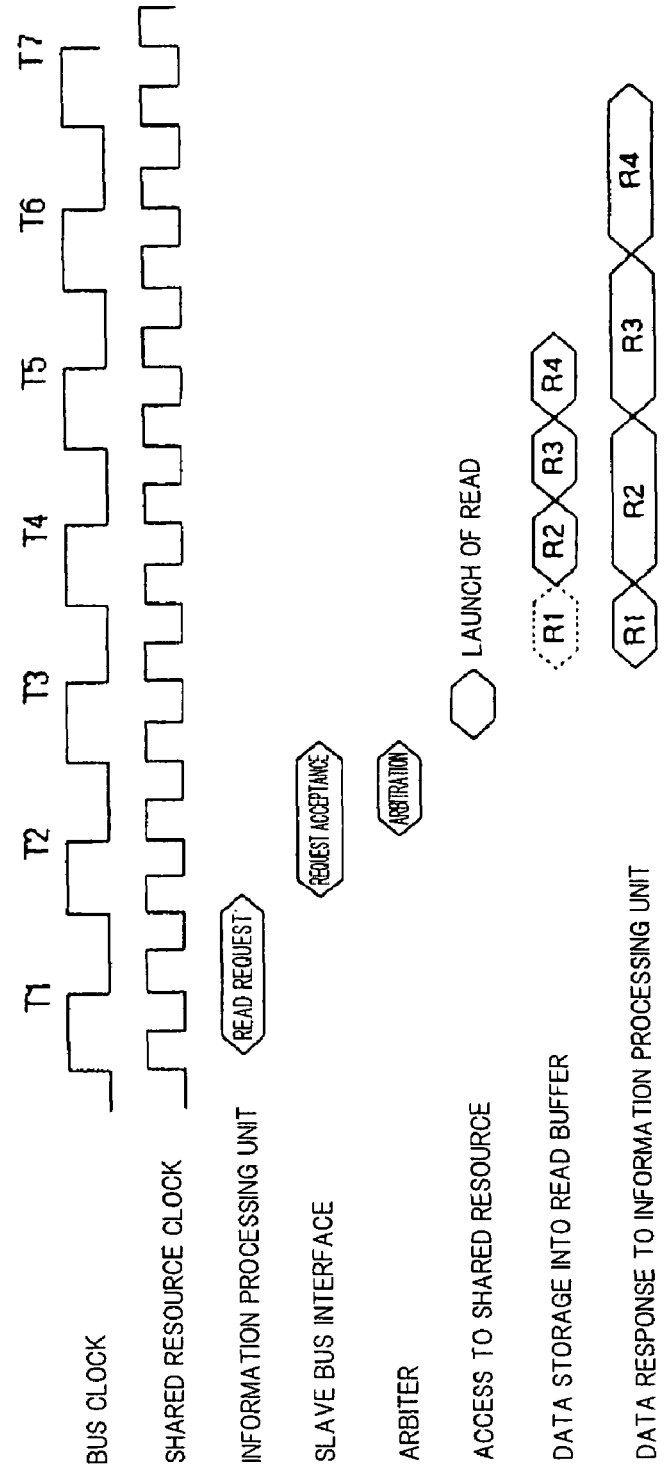
FIG. 13 is a timing chart showing an operation when data is read in the case of the configuration shown in FIG. 12.

FIG. 13 is a timing chart showing an operation when the data is read out in the case of the configuration shown in FIG. 12. With reference to FIG. 13, only the timing of the data response to the information processing unit is different from the timing chart shown in FIG. 4.

In the example shown in FIG. 13, at first data transfer R1, the data response is performed in T3 cycle with buffer through path 701. At subsequent data transfers R2 to R4, the data response is performed in T4 to T6 cycle via normal read buffer 702. As a result, the data transfer has been completed one cycle earlier than in the example shown in FIG. 4.

Next, an operation showing a case where information processing unit 1 stores the data in shared resource 8 will be described by using FIG. 5.

Figure 5:
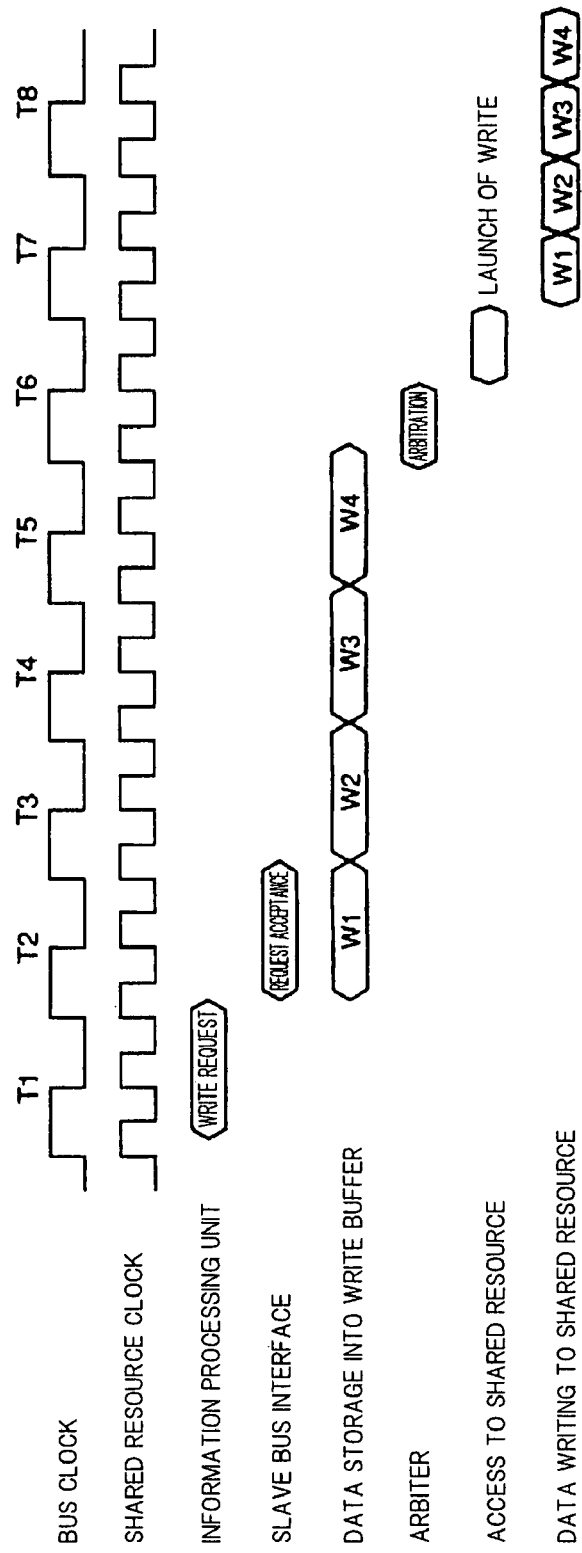
FIG. 5 is a timing chart showing the operation of the information processing apparatus shown in FIG. 3 when it writes data.

FIG. 5 is a timing chart showing the operation of the information processing apparatus shown in FIG. 3 when it stores the data.

As shown in FIG. 5, when information processing unit 1 issues a data writing request (hereinafter referred to as "write request") to shared resource 8, the above described write request is sent via bus interface 4 to multi-layer bus 7 at a timing of T1, similarly to when the read request is issued. When input stage 26 of multi-layer bus 7 receives the write request from information processing unit 1, decoder 23 determines that it is the access request to shared resource 8, based on the address of the access destination included in the above described write request, and transfers the above described write request to bus interface 11.

Bus interface 11 accepts this access request at a timing of T2. When bus interface 11 determines that the access request is the write request, bus interface 11 receives writing four words of data (hereinafter referred to as "write data"), at a timing from T2 to T5 in this case.

When write buffer 15 completes receiving the write data at the timing of T5, write buffer 15 sends the write request to arbiter 17 at a timing of the first half of T6.

When the access request to shared resource 8 is permitted in the arbitration by arbiter 17, write buffer 15 starts the process of writing the data to shared resource 8 from a timing of T7 (launch of Write), and stores the write data of four words in shared resource 8 at a timing of T7 to T8.

Therefore, while write buffer 15 is executing the process of writing the data to shared resource 8, the access request via read buffers 13 and 14 or write buffer 16 can be processed.

Also, if the processing speed of shared resource 8 is faster than the transmission rate of the bus, it is possible to respond to the information processing unit at the transfer speed of the bus, while first storing a certain amount of data in the buffer and then writing the data to the shared resource at the processing speed of the shared resource when the information processing unit writes the data to the shared resource, or while writing the data from the shared resource to the buffer in the case of reading the data. Conversely, if the transmission rate of the bus is faster, an unnecessary waiting process at the bus can be eliminated by temporarily storing the data in the read buffer or in the write buffer, which improves bus usage efficiency.

This is realized by the bus interface including both the read buffer and the write buffer, such as including read buffer 13 and write buffer 15 with respect to bus interface 11 and including read buffer 14 and write buffer 16 with respect to bus interface 12 in this embodiment.

Incidentally, in the configuration shown in FIG. 3, arbiter 17 arbitrates the access requests received via read buffers 13 and 14 and write buffers 15 and 16 included in bus interfaces 11 and 12, and determines the order of access with respect to shared resource 8. Here, if the addresses for access are different, the processing speed of the information processing apparatus can be expected to be improved by preferentially processing the read request as described above. This is because the time in which the information processing unit waits for the response from shared resource 8 is reduced by reducing the time for waiting for data to be transferred to the read buffer with respect to the read request.

However, if the multiple access requests have been issued with respect to the same address by different information processing units or by the same information processing unit, the order of accepting the access requests has to be maintained.

For example, if data is continuously read out from the same address as the address for writing the data stored in the write buffer, the data, before being updated is read out if the reading process is not executed after storing the data that is in the write buffer into the memory (shared resource). In addition, if the data is written to the same address from the different information processing units, the data in memory is not correctly updated without maintaining the order of two access requests.

Therefore, in the information processing apparatus of this embodiment, each of bus interfaces 11 and 12 may be provided with an address comparator (not shown). For example, when a new write request with respect to shared resource 8 is received by write buffer 15, the address comparator compares the write data stored in write buffer 16 and its write address respectively. Then if there is the write data to be stored at the same address, the received new write request is controlled such that it is not transferred to arbiter 17 until the data is stored in shared resource 8. Also at the same time, if there is read data for which the reading process has not been completed, in read buffers 13 and 14, the address comparator compares the read data with their read addresses respectively. Then if the data is being read from the same address as the address of the newly received write request, the received new write request is controlled such that it is not transferred to arbiter 17 until the reading process is completed.

By performing such a process, arbiter 17 can perform arbitration independently of the order in which the access requests arrive at bus interfaces 11 and 12, and the performance of the information processing apparatus can be improved by performing the process for the read request as a priority over the process for the write request.

It should be noted that process priorities may be preset for information processing units 1 to 3, read buffers 13 and 14, as well as for write buffers 15 and 16. In that case, when arbiter 17 receives the multiple access requests with respect to share resource 8, arbiter 17 preferentially permits the access request from the information processing unit or from the buffer having the higher priority according to the preset priorities.

By performing such a process, for example, if there is an information processing unit that is requesting a faster response, the response time with respect to the read request from that information processing unit can be reduced. In particular, a more flexible system can be constructed by storing the setting of the priorities in a rewritable register by software or the like.

However, also in the case of setting priorities for information processing unit or for respective buffers, if the access request with respect to the same address as the data in the read buffer or in the write buffer has been issued, the order of accepting those access requests has to be maintained.

For example, if the read request with respect to the same address has been issued subsequent to the write request, the read request issued subsequently cannot be processed unless the data in the write buffer is completely stored in the shared resource. In that case, the process of writing the data in the write buffer has to be preferentially performed. At the above described bus interfaces 11 and 12, priority for the write request is set lower than priority for the read request.

Therefore, if the access request with respect to the same address has been issued, write buffers 15 and 16 set the priority for the write request equal to or higher than the priority for the read request, and request arbiter 17 to perform the arbitration. Since arbiter 17 preferentially permits the write request that has the higher priority, the data in the write buffer is preferentially stored in shared resource 8.

It should be noted that if a state has continued in which the access request cannot obtain an access right due to its lower priority, bus interfaces 11 and 12 may raise the priority of the information processing unit or the buffer which has issued the access request. Also it is possible to perform a process raising the priority of the access request from one bus interface among the multiple bus interfaces that correspond to shared resource 8 and the like.

SECOND EMBODIMENT

Next, the second embodiment of the information processing apparatus of the present invention will be described by using the drawings.

The information processing apparatus of the second embodiment has a configuration in which the data read from the shared resource to the read buffer is held as long as possible even after a read response has been completed, and if the subsequent access request is the read request with respect to the same address, the read data is sent from the read buffer to the information processing unit without accessing shared resource 8.

Figure 6:
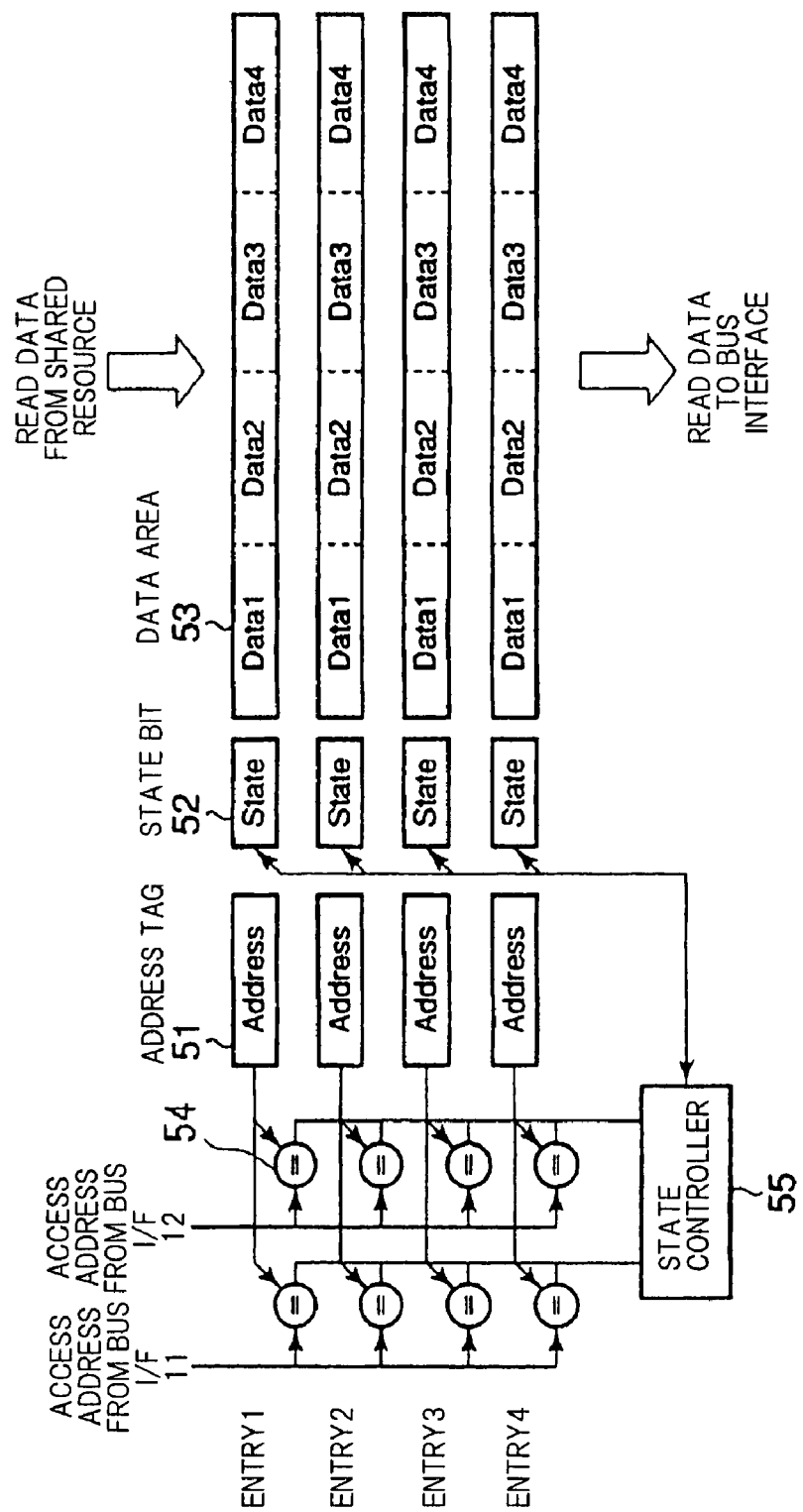
FIG. 6 is a block diagram showing a configuration of a read buffer included in the information processing apparatus of the second embodiment.

FIG. 6 is a block diagram showing the configuration of a read buffer included in the information processing apparatus of the second embodiment. It should be noted that the read buffer shown in FIG. 6 shows an example of being configured with four entries.

As shown in FIG. 6, each entry includes data area 53 in which the read data of multiple words (four words in FIG. 6) is stored, state bit 52 for indicating whether the read data stored in data area 53 is valid or invalid, address tag 51 for indicating the address (for example, leading address) of the read data, address comparator 54 for comparing address tag 51 and the address of the access destination extracted from the access request, respectively.

State controller 55 collects comparison results by address comparator 54 and updates each state bit 52 respectively based on the above described comparison results. The read data read from shared resource 8 is stored in data area 53, and the read data in data area 53 is sent to bus interface 11 or 12.

Figure 7:
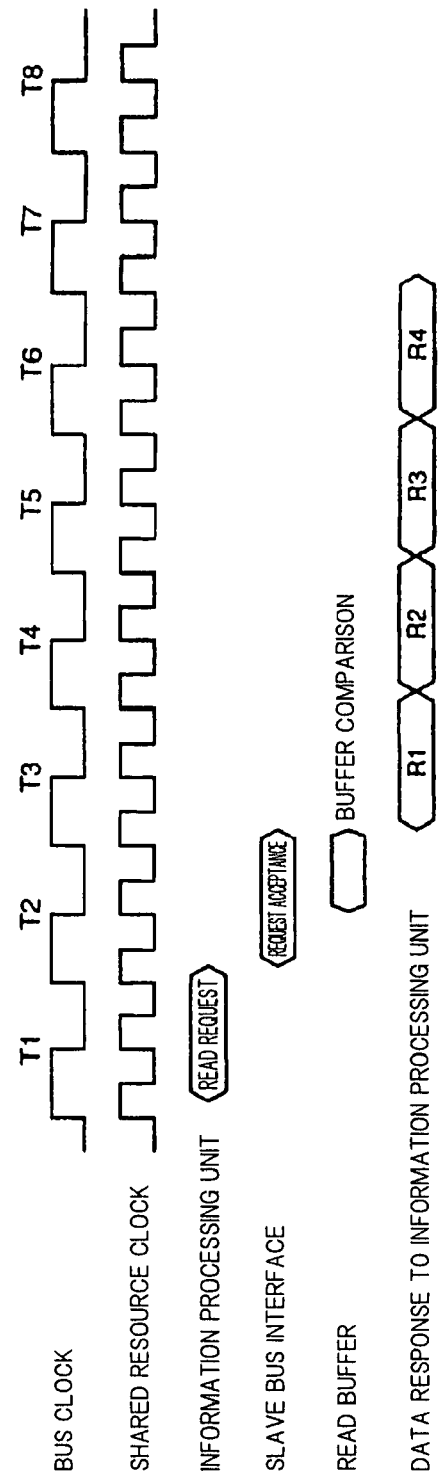
FIG. 7 is a timing chart showing an operation of the read buffer shown in FIG. 6.

FIG. 7 is a timing chart showing an operation of the read buffer shown in FIG. 6.

As shown in FIG. 7, in the information processing apparatus of the second embodiment, when information processing unit 1 issues the read request to shared resource 8, the above described read request is sent via bus interface 4 to multi-layer bus 7 similar to the first embodiment, and transferred to bus interface 11 according to the decoding result by decoder 23.

Bus interface 11 accepts this access request at a timing of T2. When bus interface 11 determines that the access request is the read request, address tag 51 in each entry and the address of the access destination included in the above described read request are compared by address comparator 54. If the address of the access destination and a value of address tag 51 are same and if there is an entry that indicates that state bit 52 is valid, bus interface 11 determines that the access to shared resource 8 is not required, and returns the read data held in data area 53 of the above described entry in the read buffer to information processing unit 1, from a timing of T3.

When the data has been read from shared resource 8 and stored in data area 53, state controller 55 sets state bit 52 of the above described entry to valid, and when the writing data with respect to the same address has been detected by address comparator 54, state controller 55 sets state bit 52 of the above described entry to invalid. In addition, when a new read request has been received, if valid data is stored in all entries and if their addresses are different from the address of the access destination for the above described read request, the entry to be replaced with new read data is determined according to a preset procedure.

According to the information processing apparatus of this embodiment, response speed of reading the data by the information processing unit is improved and also data consistency between each buffer and the shared resource can be maintained, which can reduce the frequency of accessing the shared resource. In particular, if data has been read from the shared resource in units of multiple words and held in the read buffer, efficiency of using the resource by the information processing unit which reads the data mainly in units of one word can be improved. In addition, the data can be held in the buffer for a long term, and also the frequency of accessing the shared resource can be distributed.

It should be noted that, also with respect to the write buffer, if one entry is configured in units of the write data of several words similar to the read buffer shown in FIG. 6, when the writing process is performed with respect to continuous addresses in units of one word, the processes of writing to the shared resource can be performed at one time by integrating those write data in the write buffer, which can efficiently reduce the number of times of accessing the shared resource.

Moreover, efficiency of accessing the shared resource can be further improved and also the data reading response speed can be improved, by holding the write data from the information processing unit in the write buffer and writing the write data to the shared resource regardless of the order of the write requests, such as by delaying the actual writing to the shared resource until the shared resource is not in a specific state, when another access request to the shared resource does not occur and when the read request with respect to the same address has occurred.

THIRD EMBODIMENT

Figure 8:
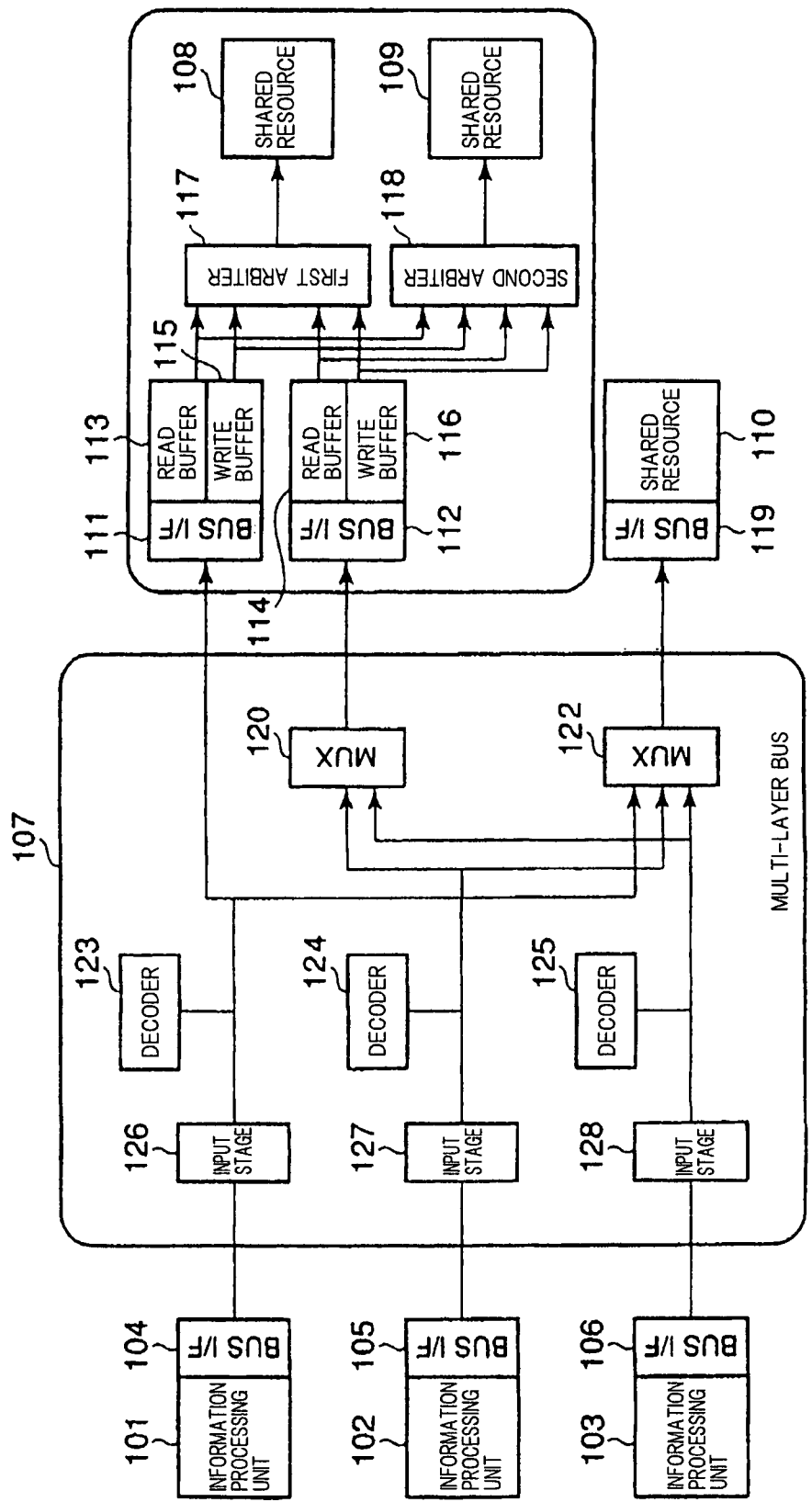
FIG. 8 is a block diagram showing a configuration of the third embodiment of the information processing apparatus of the present invention.

FIG. 8 is a block diagram showing a configuration of the third embodiment of the information processing apparatus of the present invention.

As shown in FIG. 8, the information processing apparatus of the third embodiment has a configuration in which information processing units 101 to 103 and shared resources 108 to 110 are connected via multi-layer bus 107, and two bus interfaces 111 and 112 are provided corresponding to shared resource 108 and shared resource 109. Bus interfaces 111 and 112 include read buffers 113 and 114 and write buffers 115 and 116, bus interfaces 111 and 112 are connected to shared resource 108 via first arbiter 117, and bus interfaces 111 and 112 are connected to shared resource 109 via second arbiter 118.

Multi-layer bus 107 is configured to have input stages 126 to 128 which are input/output interfaces that are provided and that correspond to information processing units 101 to 103, multiplexers 120 and 122 for arbitrating various requests (access requests) issued by respective information processing units 101 to 103 with respect to shared resources 108 to 110, and decoders 123 to 125 for transferring the access requests issued by information processing units 101 to 103 to their destinations to where they will be sent, that is, shared resources 108 to 110.

Since shared resource 110 is configured to include one bus interface similar to a conventional configuration, the access requests from information processing units 101 to 103 are arbitrated by multiplexers 120 and 122.

It should be noted that shared resource 108 and shared resource 109 that share two bus interfaces 111 and 112 are not required to be devices having the same property, and may be different in latency or data transfer speed. Since other configurations and processes are similar to those of the information processing apparatuses of the first and second embodiments, description thereof is omitted.

According to the information processing apparatus of this embodiment, similar effects as the first and second embodiments can be obtained also with respect to multiple shared resources 108 and 109 that have different transfer speeds without increasing read buffers 113 and 114 and write buffers 115 and 116.

For example, if a memory controller connected to the outside such as a SOC and an internal memory are handled in an integrated manner to absorb the difference in their data transfer speeds, advantages of the present invention can be obtained with respect to multiple memory resources.

FOURTH EMBODIMENT

Figure 9:
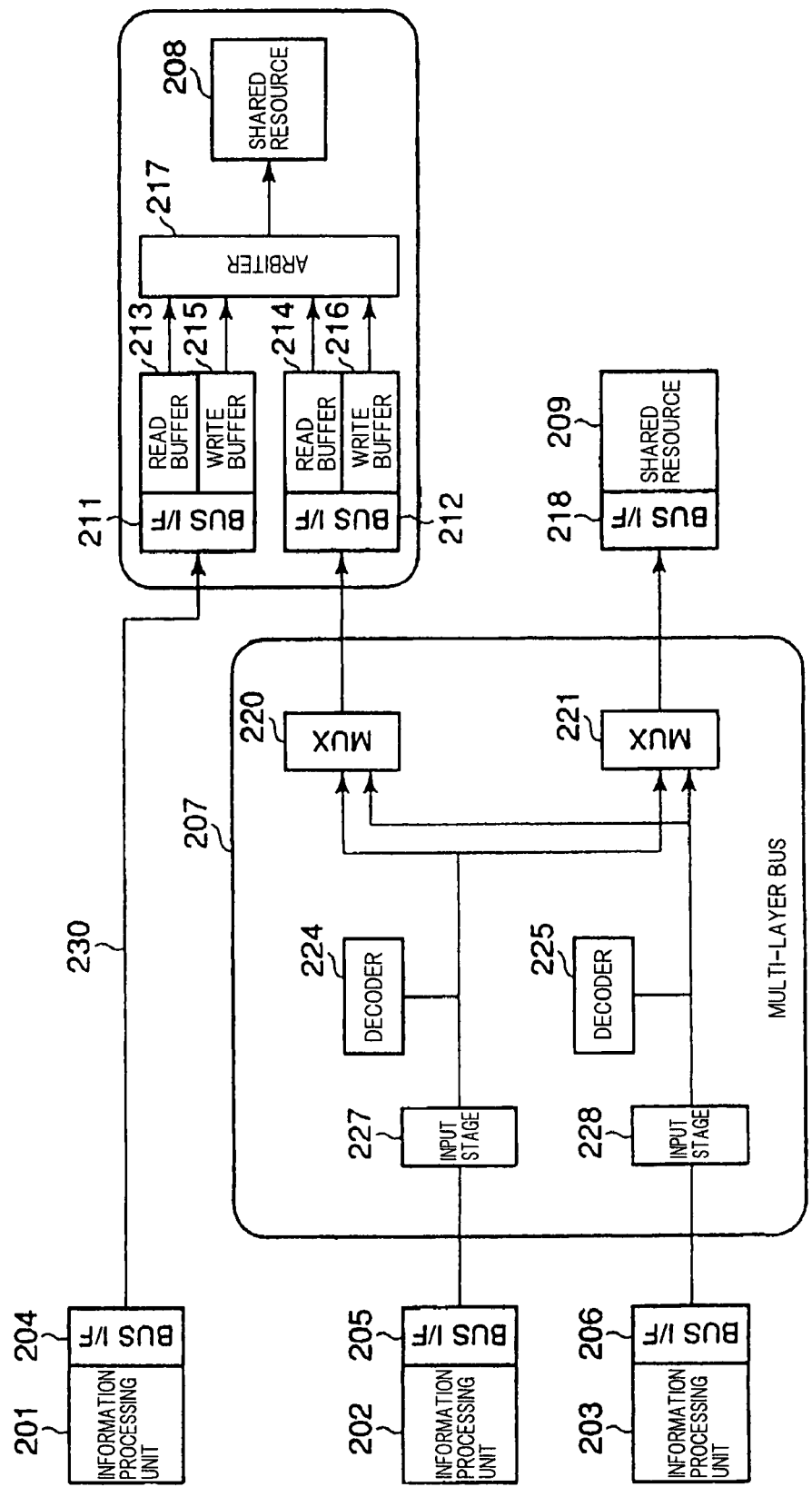
FIG. 9 is a block diagram showing a configuration of the fourth embodiment of the information processing apparatus of the present invention.

FIG. 9 is a block diagram showing a configuration of the fourth embodiment of the information processing apparatus of the present invention.

As shown in FIG. 9, the information processing apparatus of the fourth embodiment includes information processing units 201 to 203 and shared resources 208 and 209, and information processing units 202 and 203 and shared resources 208 and 209 are configured to be connected via multi-layer bus 207.

Shared resource 208 includes two bus interfaces 211 and 212 correspond to each other, and information processing unit 201 and bus interface 211 are configured to be connected via dedicated bus 230.

Bus interface 212 is connected to information processing units 202 and 203 respectively via multi-layer bus 207, and bus interface 218 corresponding to shared resource 209 is connected to information processing units 202 and 203 respectively via multi-layer bus 207.

Multi-layer bus 207 is configured to have input stages 227 and 228 which are input/output interfaces that are provided and that correspond to information processing units 202 and 203, multiplexers 220 and 221 for arbitrating various requests (access requests) issued by respective information processing units 202 and 203 with respect to shared resources 208 and 209, and decoders 224 and 225 for transferring the access requests issued by information processing units 202 and 203 to their sending destinations, that is, shared resources 208 and 209.

Bus 230 that connects information processing unit 201 and bus interface 211 is not compliant with multi-layer bus 207, and a bus based on a different bus convention is used for bus 230. In other words, two buses based on different standards are connected to shared resource 208. Since other configurations and processes are similar to those of the information processing apparatuses of the first and second embodiments, description thereof is omitted.

In the information processing apparatus of this embodiment, read buffers 213 and 214 and write buffers 215 and 216, as well as arbiter 217 have similar configurations as the first and second embodiments, and furthermore if similar processes are executed, similar effects as the first and second embodiments can be obtained while enabling access to shared resource 208 from two buses based on different conventions. Thereby, resource sharing can be efficiently realized in the case of integrating two types or more of existing ASICs and the like on one chip.

Also in such a configuration, the cost of the information processing apparatus can be reduced since an interface with reduced functions can be provided, for example, such as an interface dedicated to reading, an interface dedicated to writing, or an interface that does not support exclusive process access.

The invention claimed is:

1. An information processing apparatus comprising:
multiple information processing units;
at least one shared resource accessed by said multiple information processing units;
multiple bus interfaces connecting said multiple information processing units and said shared resource to a bus; and
an arbiter arbitrating multiple access requests issued by said multiple information processing units, wherein the at least one shared resource is connected to multiple bus interfaces via said arbiter and each of said bus interfaces has a read buffer temporarily holding read data to be returned in response to the access request from at least one information processing unit of said multiple information processing units and a write buffer temporarily holding write data received from at least one information processing unit of said multiple information processing units,
wherein when one bus interface of said multiple bus interfaces receives the access request from said at least one information processing unit, said one bus interface compares an address of an access destination for said access request and an address of an access destination corresponding to data previously held in said read buffer and in said write buffer; and
if the access request is the access request with respect to the same address as the address of the access destination corresponding to the data held in said read buffer or in said write buffer, said one bus interface sends said access request to said arbiter, after storing said read data in said read buffer from said shared resource is completed, or after writing the write data held in said write buffer to said shared resource is completed.

2. An information processing apparatus comprising:
multiple information processing units;
at least one shared resource accessed by said multiple information processing units;
multiple bus interfaces connecting said multiple information processing units and said shared resource to a bus; and
an arbiter arbitrating multiple access requests issued by said multiple information processing units, wherein the at least one shared resource is connected to multiple bus interfaces via said arbiter and each of said bus interfaces has a read buffer temporarily holding read data to be returned in response to the access request from at least one information processing unit of said multiple information processing units and a write buffer temporarily holding write data received from at least one information processing unit of said multiple information processing units,
wherein a predetermined priority is granted to said at least one information processing unit, said read buffer or said write buffer, and said arbiter permits said access requests in an order according to said priority when said arbiter receives the multiple access requests with respect to said shared resource,
wherein if one bus interface of said multiple bus interfaces receives the access request with respect to the same address as an address of an access destination corresponding to data held in said read buffer and in said write buffer, said one bus interface raises the priority of a process for reading said read data from said shared resource to said read buffer or a process for writing said write data to said shared resource from said write buffer.

3. An information processing apparatus comprising:
multiple information processing units;
at least one shared resource accessed by said multiple information processing units;
multiple bus interfaces connecting said multiple information processing units and said shared resource to a bus; and
an arbiter arbitrating multiple access requests issued by said multiple information processing units, wherein the at least one shared resource is connected to multiple bus interfaces via said arbiter and each of said bus interfaces has a read buffer temporarily holding read data to be returned in response to the access request from at least one information processing unit of said multiple information processing units and a write buffer temporarily holding write data received from at least one information processing unit of said multiple information processing units,
wherein when said read buffer of one bus interface of said multiple bus interfaces receives the access request from said at least one information processing unit, said one bus interface compares an address of an access destination for said access request and an address of an access destination corresponding to read data previously held in said read buffer, and
if the access request is the access request with respect to the same address as the address of the access destination corresponding to the read data held in said read buffer, said bus interface returns the read data held in said read buffer to said at least one information processing unit without reading said read data from said shared resource.

4. An information processing apparatus comprising:
multiple information processing units;
at least one shared resource accessed by said multiple information processing units;
multiple bus interfaces connecting said multiple information processing units and said shared resource to a bus; and
an arbiter arbitrating multiple access requests issued by said multiple information processing units, wherein the at least one shared resource is connected to multiple bus interfaces via said arbiter and each of said bus interfaces has a read buffer temporarily holding read data to be returned in response to the access request from at least one information processing unit of said multiple information processing units and a write buffer temporarily holding write data received from at least one information processing unit of said multiple information processing units,
wherein when said write buffer of one bus interface of said multiple bus interfaces receives the access request from said at least one information processing unit, said one bus interface compares an address of an access destination for said access request and an address of an access destination corresponding to the write data previously held in said write buffer; and
if the access request is the access request with respect to an address continuous with the address of the access destination corresponding to the write data held in said write buffer, said one bus interface stores the write data retained in said write buffer and the write data received from said at least one information processing unit together in said shared resource.

5. An information processing apparatus comprising:
multiple information processing units;
at least one shared resource accessed by said multiple information processing units;
multiple bus interfaces connecting said multiple information processing units and said shared resource to a bus; and
an arbiter arbitrating multiple access requests issued by said multiple information processing units, wherein the at least one shared resource is connected to multiple bus interfaces via said arbiter and each of said bus interfaces has a read buffer temporarily holding read data to be returned in response to the access request from at least one information processing unit of said multiple information processing units and a write buffer temporarily holding write data received from at least one information processing unit of said multiple information processing units,
wherein said multiple bus interfaces correspond to multiple shared resources.

6. An information processing apparatus comprising:
multiple information processing units;
at least one shared resource accessed by said multiple information processing units;
multiple bus interfaces connecting said multiple information processing units and said shared resource to a bus; and
an arbiter arbitrating multiple access requests issued by said multiple information processing units, wherein the at least one shared resource is connected to multiple bus interfaces via said arbiter and each of said bus interfaces has a read buffer temporarily holding read data to be returned in response to the access request from at least one information processing unit of said multiple information processing units and a write buffer temporarily holding write data received from at least one information processing unit of said multiple information processing units,
wherein said shared resource is a main memory with a SDRAM, and said arbiter knows a state of said SDRAM, and based on said state, determines the access request to be preferentially selected,
wherein said arbiter preferentially selects the access request wherein a number of arbitration operations has exceeded a predetermined number since the access request was issued, regardless of the state of said SDRAM.

7. An information processing apparatus comprising:
multiple information processing unit;
at least one shared resource accessed by said multiple information processing units;
multiple bus interfaces connecting said multiple information processing units and said shared resource to a bus; and
an arbiter arbitrating multiple access requests issued by said multiple information processing units, wherein the at least one shared resource is connected to multiple bus interfaces via said arbiter and each of said bus interfaces has a read buffer temporarily holding read data to be returned in response to the access request from at least one information processing unit of said multiple information processing units and a write buffer temporarily holding write data received from at least one information processing unit of said multiple information processing units,
wherein when an inhibited information processing unit of said multiple information processing units accessing said shared resource inhibits access with respect to said shared resource by other information processing units of said multiple information processing units; and
the access to said shared resource by, in addition to a bus interface used for the access by said inhibiting information processing unit, other bus interfaces provided in said same shared resource in which said bus interface is provided, is inhibited.

8. The information processing apparatus according to claim 7, wherein one bus interface of said multiple bus interfaces provided in said shared resource has a function of inhibiting access with respect to said shared resource by other information processing units of said multiple processing units.

9. An information processing apparatus comprising:
multiple information processing units;
at least one shared resource accessed by said multiple information processing units;
multiple bus interfaces connecting said multiple information processing units and said shared resource to a bus; and
an arbiter arbitrating multiple access requests issued by said multiple information processing units, wherein the at least one shared resource is connected to multiple bus interfaces via said arbiter and each of said bus interfaces has a read buffer temporarily holding read data to be returned in response to the access request from at least one information processing unit of said multiple information processing units and a write buffer temporarily holding write data received from at least one information processing unit of said multiple information processing units,
wherein when said at least one information processing unit accessing said shared resource inhibits the access with respect to a specific address area in said shared resource by other information processing units, the access to said specific address area in said shared resource by, in addition to a bus interface used for the access by said information processing unit which has inhibited, other bus interfaces provided in said same shared resource in which said bus interface is provided, is inhibited.

10. The information processing apparatus according to claim 9, wherein one bus interface of said multiple bus interfaces provided in said shared resource has a function of inhibiting the access with respect to said shared resource by other information processing units of said multiple information processing units.

11. An information processing apparatus comprising:

multiple information processing units;

at least one shared resource accessed by said multiple information processing units;

multiple bus interfaces connecting said multiple information processing units and said shared resource to a bus; and an arbiter arbitrating multiple access requests issued by said multiple information processing units, wherein the at least one shared resource is connected to multiple bus interfaces via said arbiter and each of said bus interfaces has a read buffer temporarily holding read data to be returned in response to the access request from at least one information processing unit of said multiple information processing units and a write buffer temporarily holding write data received from at least one information processing unit of said multiple information processing units, wherein said read buffer includes a through path for transferring data not via said read buffer, and said bus interface returns the data from said shared resource to said at least one information processing unit via said through path in a predetermined cycle.

* * * * *